(12) United States Patent
Pejathaya

(10) Patent No.: US 6,547,332 B2
(45) Date of Patent: Apr. 15, 2003

(54) CONSTANT ENGAGEMENT LINEAR MECHANISM

(75) Inventor: Srinivas Pejathaya, St. Clair Shores, MI (US)

(73) Assignee: Fishers Dynamics Corporation, St. Clair Shores, MI (US)

( * ) Notice: Subject to any disclaimer, the term of this patent is extended or adjusted under 35 U.S.C. 154(b) by 39 days.

(21) Appl. No.: 09/768,945

(22) Filed: Jan. 24, 2001

(65) Prior Publication Data

US 2002/0096921 A1 Jul. 25, 2002

(51) Int. Cl.$^7$ .................................................. B60N 2/02
(52) U.S. Cl. .......................... 297/362.14; 297/362.11; 297/362.12; 297/74; 297/89.32
(58) Field of Search ........................ 297/362.14, 362, 297/362.12, 361.1, 362.11; 74/89.23, 89.32, 89.45

(56) References Cited

U.S. PATENT DOCUMENTS

| | | | | | |
|---|---|---|---|---|---|
| 2,959,066 | A | * | 11/1960 | Bailey et al. | .................. 74/469 |
| 4,345,792 | A | * | 8/1982 | Shephard | ..................... 297/362 |
| 4,573,738 | A | * | 3/1986 | Heesch | ........................ 297/362 |
| 4,929,024 | A | * | 5/1990 | Secord | ........................ 297/362 |
| 5,199,764 | A | * | 4/1993 | Robinson | ..................... 297/361 |
| 5,524,970 | A | | 6/1996 | Kienke et al. | |
| 5,813,725 | A | | 9/1998 | Robinson | |
| 5,979,986 | A | * | 11/1999 | Pejathaya | ............... 297/362.12 |
| 6,322,146 | B1 | * | 11/2001 | Fisher, Jr. | ............... 297/362.14 |

* cited by examiner

*Primary Examiner*—Anthony D. Barfield
*Assistant Examiner*—Stephanie Harris
(74) *Attorney, Agent, or Firm*—Harness, Dickey & Pierce, P.L.C.

(57) ABSTRACT

A constant engagement linear recliner assembly is provided for implementation with a seat assembly. The constant engagement linear recliner assembly includes a recliner rod in constant mesh engagement with a gear system. As the gear system is caused to rotate, the recliner rod moves linearly with respect to the linear recliner assembly. The linear motion of the recliner rod translates into pivotable motion of a seat back relative to a seat.

32 Claims, 7 Drawing Sheets

CONSTANT ENGAGEMENT LINEAR MECHANISM

FIELD OF THE INVENTION

The present invention generally relates to linear recliner assemblies and more particularly to a constant engagement linear recliner assembly.

BACKGROUND OF THE INVENTION

Occupant safety and comfort are paramount concerns for automobile manufacturers. In particular, vehicle seating systems are a significant focus for improved comfort and safety. Conventional vehicle seating systems include reclining seats that enable comfort adjustment by a vehicle occupant.

Traditional recliner mechanisms include linear recliner assemblies having a recliner rod that is selectively in engagement with a pawl. To adjust a seat back relative to a seat, the recliner rod must be out of engagement with the pawl, wherein the seat back is free to pivot relative to the seat. During this time, an occupant's safety may be compromised as there is no fixed support for the seat back, were an accident to occur.

SUMMARY OF THE INVENTION

Accordingly, the present invention provides a constant engagement linear recliner assembly including a recliner rod, a housing, a first gear assembly and a second gear assembly. Both the first and second gear assemblies are rotatably supported within the housing and are in constant mesh engagement with one another. The second gear assembly is in constant mesh engagement with the recliner rod for enabling linear movement of the recliner rod relative to the housing. More particularly, the gear components of the first gear assembly rotate within a plane generally perpendicular relative to components of the second gear assembly.

DETAILED DESCRIPTION OF THE PREFERRED EMBODIMENT

Figure 1:
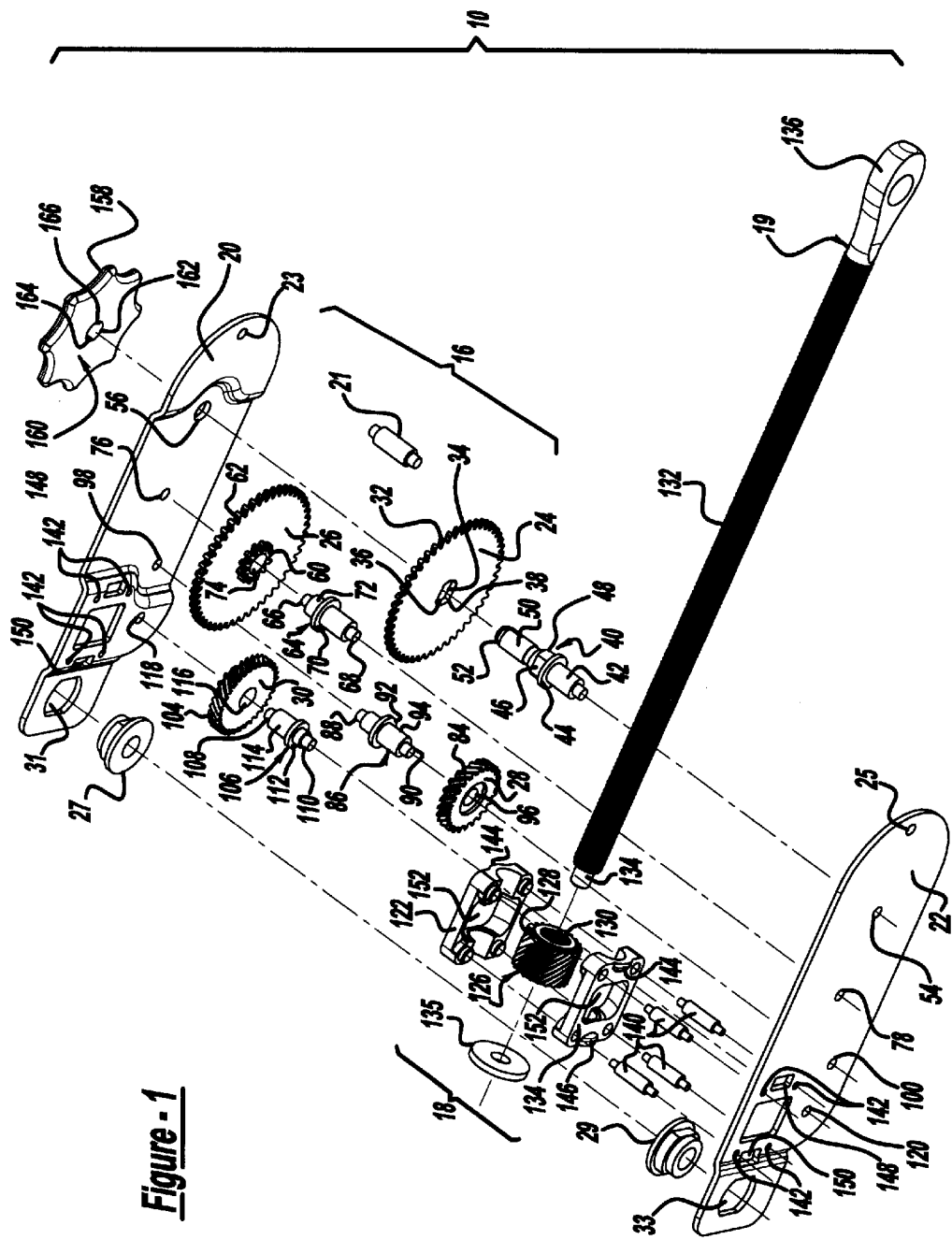
FIG. 1 is an exploded view of a constant engagement linear recliner assembly according the principles of the present invention.
Figure 2:
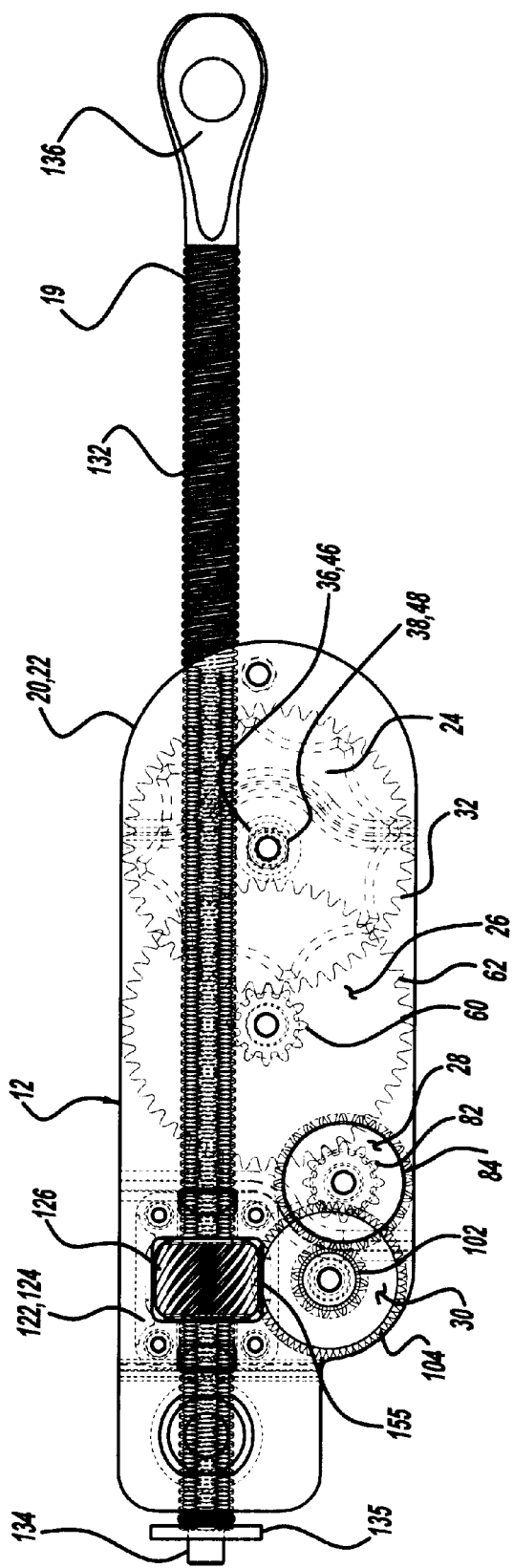
FIG. 2 is a side sectional view of the linear recliner assembly of FIG. 1, detailing the relationship of the internal components.

With reference to FIGS. 1–5, a constant engagement linear recliner assembly 10 is shown. The constant engagement linear recliner assembly 10 includes a housing 12, a recliner rod 14, a first gear assembly 16, and a second gear assembly 18. The first and second gear assemblies 16,18 are supported within the housing 12 for linearly reciprocating the recliner rod 14 relative to the housing 12.

The housing 12 includes first and second support plates 20,22 housing the recliner rod 14 and gear assemblies 16,18. A spacer 21 is supported between the first and second support plates 20,22 by openings 23, 25, respectively. First and second mounts 27,29 are supported within openings 31,33 of first and second support plates 20,22, respectively, to mount the linear recliner assembly 10 to a seat assembly. The first and second mounts each have a key type interface within the respective openings, 31,33, thus preventing the first and second mounting brackets from rotating within the openings 31,33.

The first and second gear assemblies 16,18 are in constant mesh engagement with one another and the second gear assembly 18 is in constant engagement with the recliner rod 14 for enabling linear movement of the recliner rod 14 relative to the housing 12. The constant mesh engagement of the gear assemblies 16,18 and recliner rod reduces vehicle seat back chucking and promotes occupant safety.

The first gear assembly 16 includes a first gear plate 24, a second gear plate 26, a third gear plate 28 and a fourth gear plate 30. The first gear plate 24 includes a first gear surface 32 generally in the form of a spur gear. The first gear plate 24 also includes a centrally disposed opening 34 having first and second key surfaces 36,38. The first gear plate 24 is fixed for rotation with a first spindle 40, which includes a support post 42, a stop collar 44, first and second key surfaces 46,48, a support surface 50, and a groove 52. The first gear plate 24 receives the first spindle 40 through the opening 34 with the stop collar 44 abutting the gear plate 24, wherein the first and second key surfaces 46,48 of the first spindle 40 mate with the first and second key surfaces 36,38 of the opening 34. In this manner, the first gear plate 24 is fixed for rotation with the first spindle 40. The support post 42 of the first spindle 40 is journalled in an opening 54 of the second support plate 22 and the support surface 50 of the first spindle 40 is journalled in an opening 56 in the first support plate 20, whereby the first spindle 40 is supported by, and free to rotate within, the housing 12.

The first gear surface 32 maintains constant mesh engagement with a second gear surface 60 of the second gear plate 26. The second gear surface 60 is also generally in the form of a spur gear, thereby enabling smooth mesh with the first gear surface 32. The second gear plate 26 also includes a third gear surface 62, which includes an axis concentric with the smaller diameter second gear surface 60. The second gear plate 26 is rotatably supported by a second spindle 64, which is further supported between the first and second support plates 20,22. The second spindle 64 includes first and second support posts 66,68, a stop collar 70, and a bearing surface 72. The second spindle 64 mounts the second gear plate 26 through a centrally disposed opening 74 and abuts the stop collar 70. In this position, the second gear plate 26 is rotatable about the bearing surface 72. The first and second support posts 66,68 of the second spindle 64 are journalled in openings 76,78 in the first and second support plates 20,22, respectively. In this manner, the second gear plate 26 is free to rotate within the housing 12.

The third gear plate 28 includes a fourth gear surface 82, also of generally spur gear form, in constant mesh engagement with the third gear surface 62. The third gear plate 28 also includes a fifth gear surface 84, which is larger in diameter than the fourth gear surface 82. The third gear plate 28 is rotatably supported on a third spindle 86 between the first and second support plates 20,22. The third spindle 86 includes first and second supports posts 88,90, a stop collar 92 and a bearing surface 94. The third spindle 86 is received through an opening 96 of the third gear plate 28 and the first and second support posts 88,90 are received into openings 98,100 of the first and second support plates 20,22, respectively. The third gear plate 28 abuts the stop collar 92 and is rotatable about the bearing surface 94. The fifth gear surface 84 of the third gear plate 28 is of generally helical gear form.

The fourth gear plate 30 includes a smaller diameter sixth gear surface 84 which is generally helical in form and in constant mesh engagement with the fifth gear surface 84 of the third gear plate 28. The fourth gear plate also includes a larger diameter seventh gear surface 104, also generally helical in form, and dispensed coaxially with the sixth gear surface 84. The fourth gear plate 30 is rotatably supported on a fourth spindle 106, which includes first and second support posts 108,110, a stop collar 112 and a bearing surface 114. The fourth spindle 106 is received through an opening 116 of the fourth gear plate 30 and the first and second support posts 108,110 are received into openings 118,120 of the first and second support plates 20,22, respectively. The fourth gear plate 30 abuts the stop collar 112 and is rotatable about the bearing surface 114.

The second gear assembly 18 includes first and second support brackets 122,124 between which a recliner gear 126 is disposed. The recliner gear 126 is rotatable within the first and second support brackets 122,124, about an axis that is generally perpendicular to the axis of rotation of the gear components of the first gear assembly 16. The recliner gear 126 includes an outer diameter gear surface 128 of generally helical gear form, and an inner diameter gear surface 130 of generally screw gear form. The recliner gear 126 also includes forward and rear planar surfaces 127,129, respectively.

The recliner rod 14 includes a threaded length 132 having a stem end 134 and a bracket end 136. The threaded length 132 is received through the recliner gear 126 wherein the inside diameter screw gear 130 of the recliner gear 126 meshes with the threaded length 132. A stopper 135 is fixedly attached to the stem end 134. As the recliner gear 126 rotates, the inside diameter screw gear 130 interfaces with threaded length 132 of the recliner rod 14 to cause linear movement of the recliner rod 14 relative to the housing 12. The linear movement of the recliner rod 14 is dependent upon the direction of rotation of the recliner gear 126. The stopper 135 prevents the recliner rod 14 from disengagement with the recliner gear 126 which would otherwise result from over-rotation of the recliner gear 126.

Figure 3:
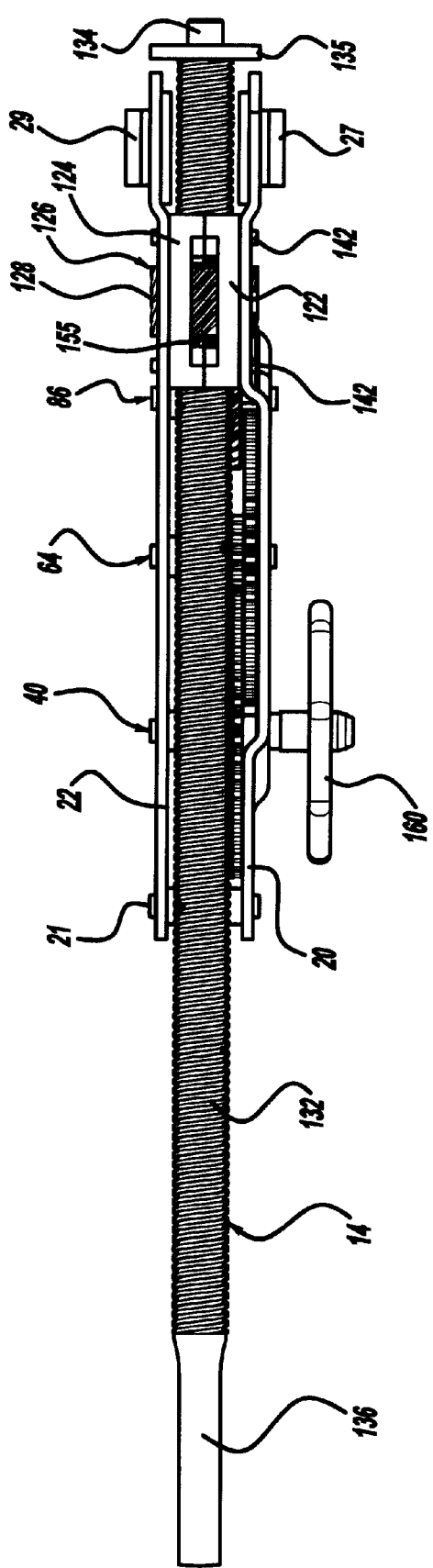
FIG. 3 is a top view of the constant engagement linear recliner assembly of the represent invention.
Figure 4:
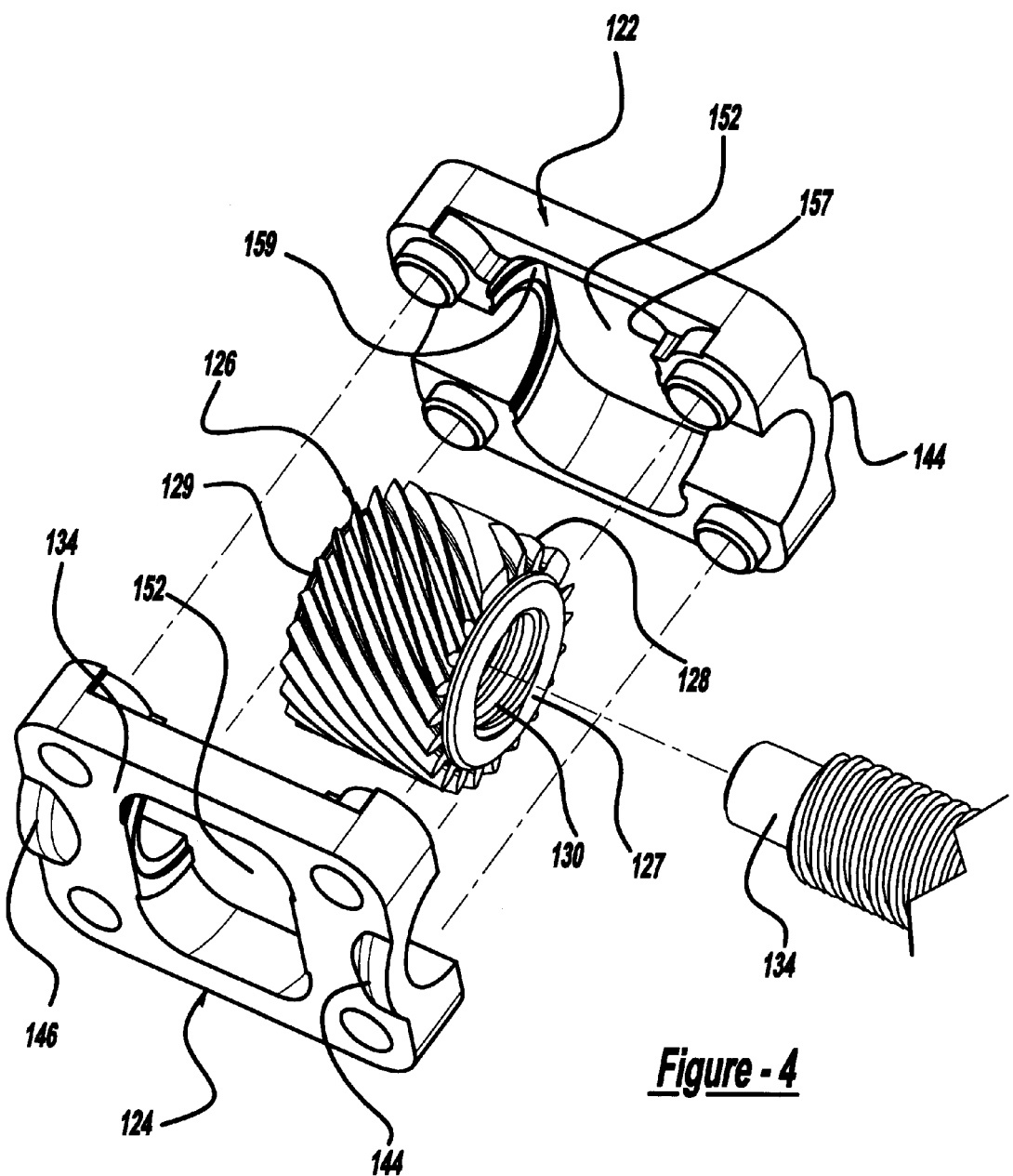
FIG. 4 is a detailed view of a gear assembly of the present invention.
Figure 5:
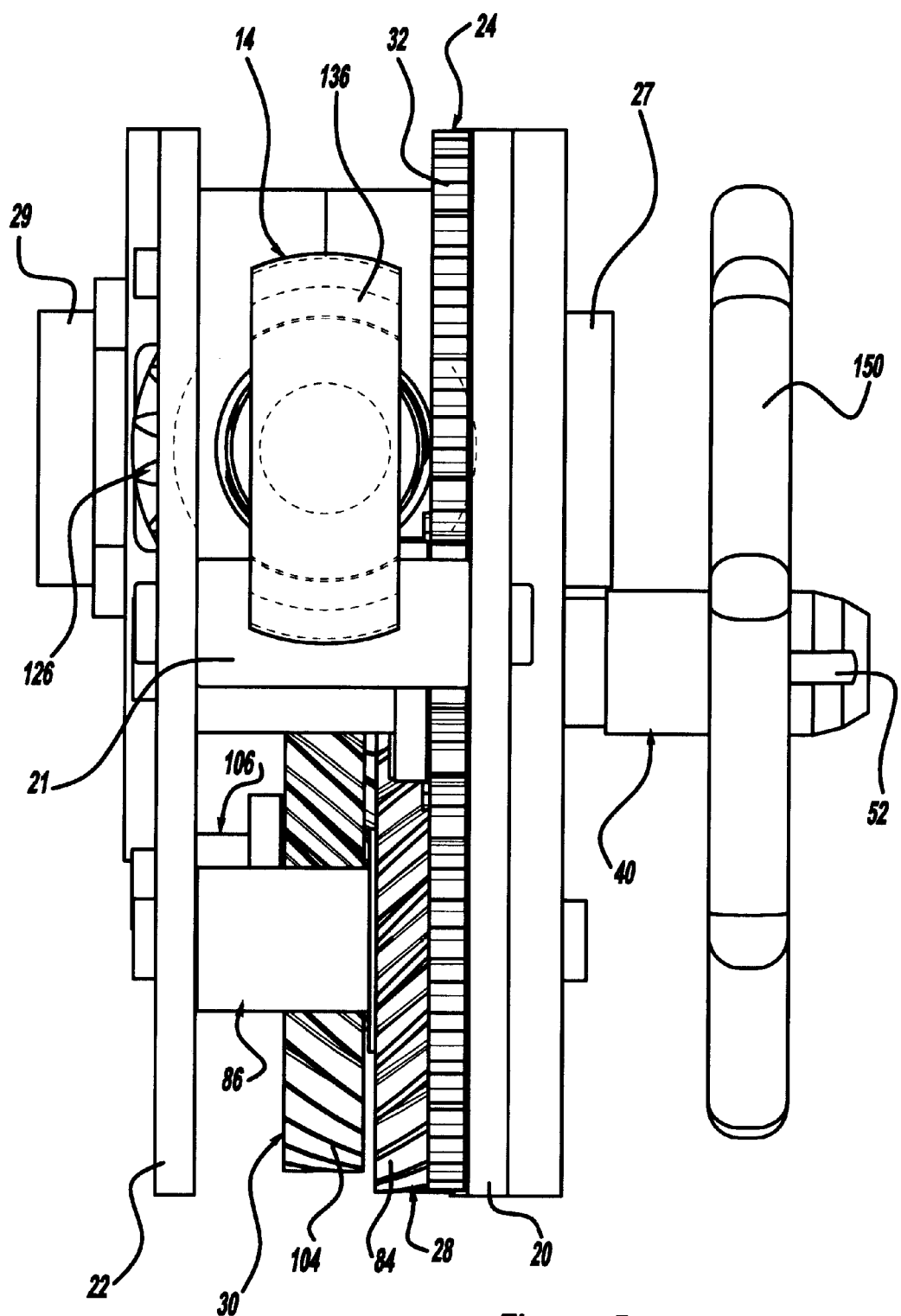
FIG. 5 is front view of the constant engagement linear recliner assembly of the resent invention.

The first and second support brackets 122,124 are interconnected and supported between the first and second support plates 20,22 by a plurality of assembly posts 140. Each of the assembly posts 140 is supported within respective openings 142 in the first and second support plates 20,22. The first and second support brackets 122,124 each include first and second tabs 144,146 that extend through respective openings 148,150 in the first and second support plates 20,22. The first and second support brackets 122,124 also include a generally rectangular opening 152 through which a surface of the recliner gear 126 is disposed, as best seen in FIG. 3. The opening 152 is partially defined by forward and rear planar surfaces 157,159, which are bearing surfaces adapted to abut the forward and rear planar surfaces 127,129 of the recliner gear 126. The first and second support brackets 122,124 include formed top and bottom surface to provide a rectangular opening 155, through which the outside diameter gear 128 of the recliner gear 126 is in constant mesh engagement with the seventh gear surface 104 of the fourth gear plate 30.

As described previously, the gear components of the first gear assembly 16 are rotatable about axes that are generally perpendicular to the axis of rotation of the recliner gear 126. In order to transfer rotation from the first gear assembly 16 to the second gear assembly 18, the helical outside diameter gear 128 of the recliner gear 126 and the helical seventh gear surface 104 of the fourth gear plate 30 are in meshing engagement. As a result, the fourth gear plate 30 experiences an axial thrust load from the helical mesh between the seventh gear surface 104 and the outside diameter gear 128 of the recliner gear 126. To balance the thrust load, the sixth gear surface 102 is also of helical gear form, but has a gear index opposite that of the seventh gear surface 104. As described previously, the sixth gear surface 102 is in constant mesh engagement with the fifth gear surface 84. The fifth gear surface 84 is also of helical gear form and is counter indexed to that of the seventh gear surface 104. The mesh between the fifth gear surface 84 and the sixth gear surface 102 creates an axial thrust load in the fourth gear plate 30 opposite to the axial thrust load created between the interface of the outside diameter gear 128 of the recliner gear 126 and the seventh gear surface 104. Thus, the thrust loads are balanced and the fourth gear plate 30 does not experience axial movement along the bearing surface 114 of the fourth spindle 106.

In a first preferred embodiment of the constant engagement linear recliner assembly 10 of the present invention, a dial 160 is fixed for rotation with the first spindle 40. The dial 160 includes a centrally disposed opening 162 having first and second splines 164,166. An outside diameter 158 of the dial 160 may also be ergonomically formed to enable a better grip by an operator. The dial 160 is assembled onto the first spindle 40 wherein the first spindle 40 is inserted through the opening 162 and the first and second splines 164,166 are aligned for engagement with the groove 52 of the first spindle 40. Once mounted, the dial 160 is fixed for rotation with the first spindle 40 and as the dial 160 is caused to rotate by an operator, the first spindle 40 subsequently rotates.

Figure 6:
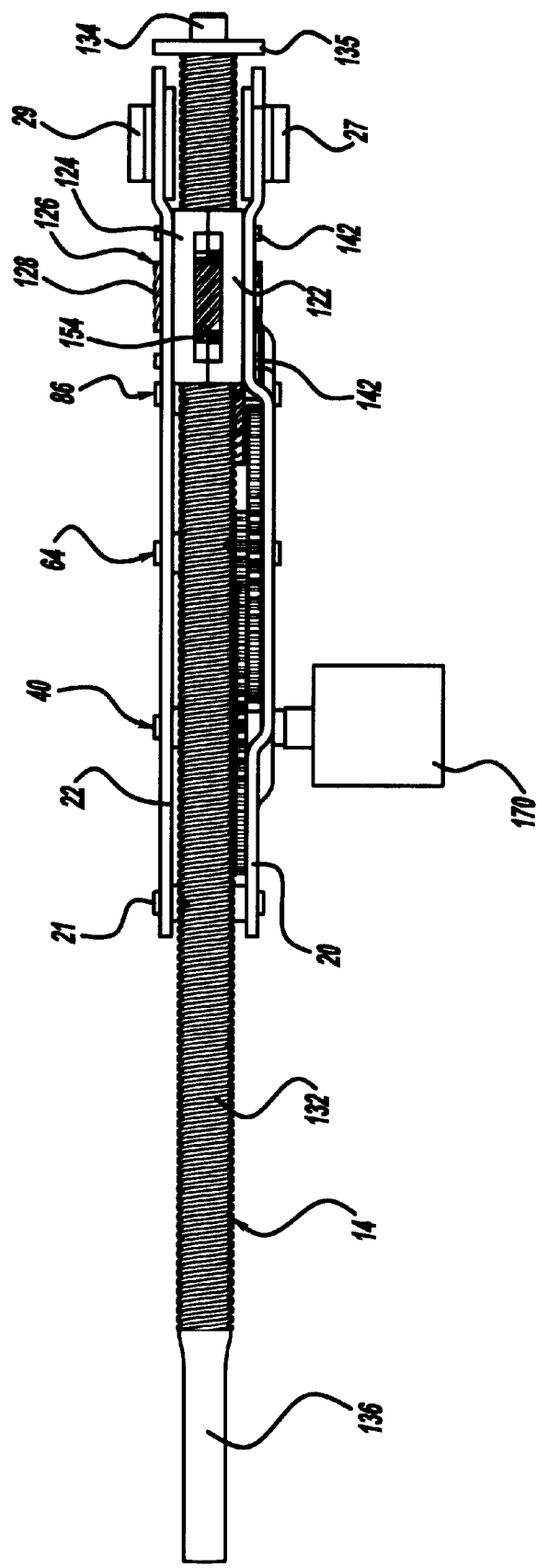
FIG. 6 schematically illustrates a second preferred embodiment of the constant engagement linear recliner assembly of the present invention.

In a second preferred embodiment, the first spindle 40 may be mechanically actuated by an electric motor 170 wherein the linear recliner assembly 10 can be remotely operated. With particular reference to FIG. 6, the electric motor 170 is shown operably connected to the first spindle 40. The electric motor 170 is operable in three modes by a switch (not shown). The first mode rotates the electric motor 170 in a first direction, subsequently rotating the first spindle 40 in the first direction. The second mode rotates the electric motor 170 in a second direction opposite to the first direction, subsequently rotating the first spindle 40 in the second direction. The third mode is a neutral mode wherein the electric motor 170 is inactive.

Axial loading of the recliner rod 14, such as during front or rear vehicle collision, results in linear motion of the recliner gear 126 within the first and second support brackets 122,124. This linear motion is slight but, depending upon the direction of movement, the forward or rear planar surfaces 127,129 of the recliner gear 126 contact the forward or rear planar surfaces 157,159, respectively, prohibiting further linear movement of the recliner rod 14. In this manner, the recliner rod 14 and recliner gear 126 provide a load column for supporting axial loads applied to the constant engagement linear recliner assembly 10. Further, because the first and second gear assemblies 16,18 and recliner rod 14 remain in constant engagement, occupant safety is enhanced.

Figure 7:
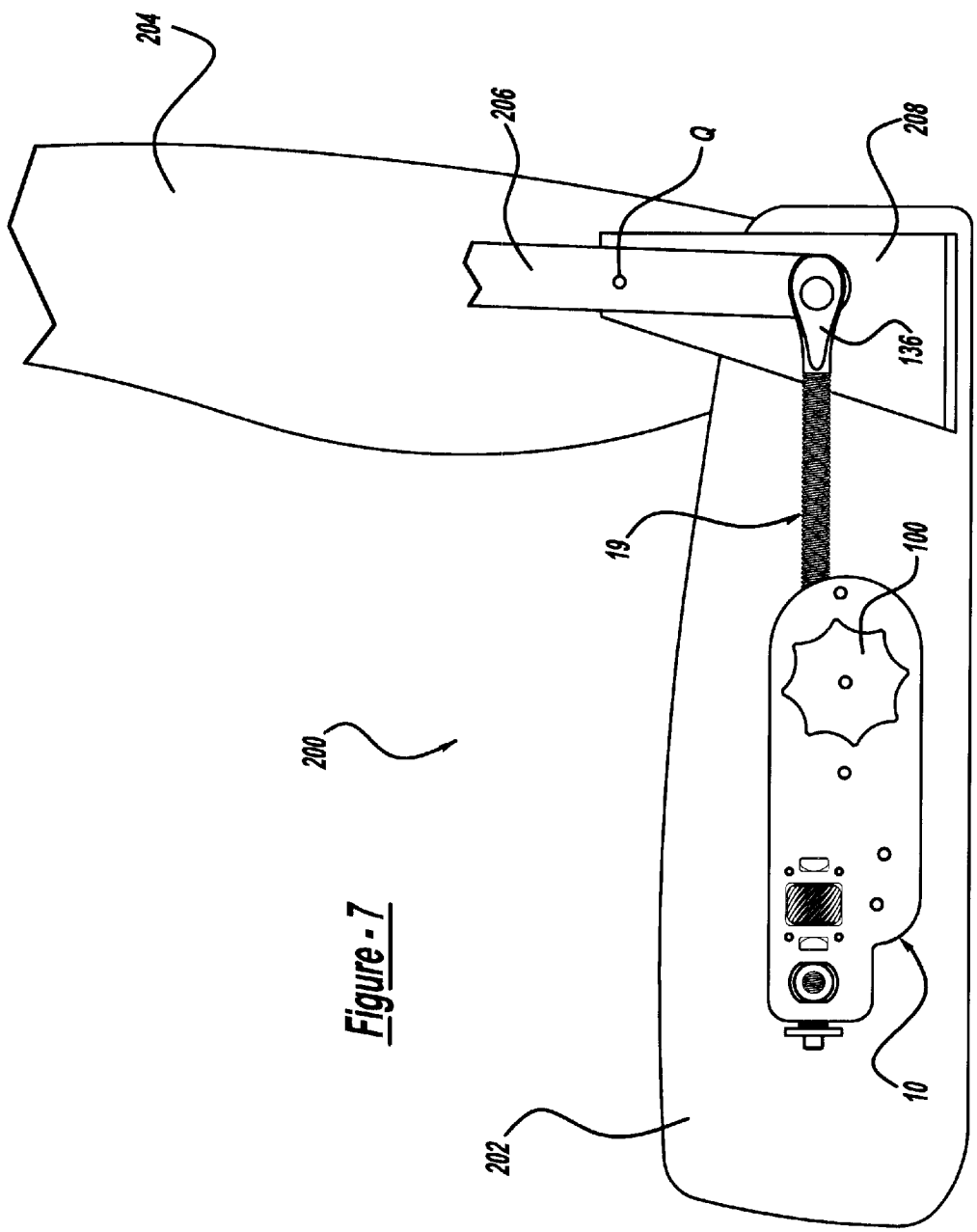
FIG. 7 is a schematic view of a seat assembly implementing the constant engagement linear recliner assembly of the present invention.

In an exemplary embodiment of the present invention, the threaded length 132 of the recliner rod 126 is a lead screw with American standard 29° stub ACME threads that interface with the inner diameter screw gear 130 having equivalent internal thread form. The outside diameter gear 128 has a 45° helix angle. The seventh gear surface 104 has a 45° helix angle. Preferably, the gear reduction between the fourth gear plate 30 and the recliner gear 126 is 1.5:1, between the third gear plate 28 and the fourth gear plate 30, 2:1, between the second gear plate 26 and the third gear plate 28, 4:1, and between the first gear plate 24 and the second gear plate 26,4:1. The recliner gear 126 and recliner rod 14 ratio thus provides six (6) rotations of the first spindle 40 per one (1) inch of linear movement. Therefore, forty-eight (48) rotations of the first spindle 40 moves the recliner rod 14 eight (8) inches With particular reference to FIG. 7, a seat assembly 200 according to the invention is shown. The seat assembly 200 includes a seat 202, a seat back 204 and the constant engagement linear recliner assembly 10 of the present invention. The seat back 204 is supported by a support arm 206 and is pivotable relative to the seat 202. The support arm 206 is pivotally attached to a support bracket 208 and is pivotable about an axis Q of the support bracket 208. A terminal end of the support arm 206 is pivotally connected with the bracket end 136 the recliner rod 14. As the dial 150, or the motor 160, is caused to rotate, the recliner rod 14 moves linearly relative to the linear recliner assembly 10. The linear movement of the recliner rod 14 results in pivotal movement of the support arm 206 and seat back 204 relative to the seat 202 about axis Q. In an exemplary embodiment of the present invention, the distance between the recliner rod 14 and the support arm 206 connection and the axis Q is approximately 3.2 inches. This results in a 3.2 inch moment arm. To achieve 50° of seat back travel, for example, the dial 150 must rotate 126°, which is less than one whole rotation of the dial 150.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the description of the appended claims.

What is claimed is:

1. A linear recliner assembly, comprising;
  a housing;
  a recliner rod able to reciprocate linearly relative to said housing;
  a first gear assembly supported by said housing and having a counter thrust component;
  a second gear assembly supported by said housing and in constant mesh engagement with said first gear assembly and said recliner rod, said constant mesh engagement enabling linear movement of said recliner rod relative to said housing and causing an axial thrust load on said first gear assembly; and
  wherein said counter thrust component balances said axial thrust load on said first gear assembly.

2. The linear recliner assembly of claim 1, wherein said constant mesh engagement between said first gear assembly and said second gear assembly includes constant helical mesh engagement.

3. The linear recliner assembly of claim 2, wherein said counter thrust component includes a helical gear assembly, said counter thrust component having a gear index opposite of said constant helical mesh engagement between said first gear assembly and said second gear assembly.

4. The linear recliner assembly of claim 1, wherein all gear components of said first gear assembly including said counter thrust component rotate within a plane generally perpendicular to all gear components of said second gear assembly.

5. A reclining seat assembly, comprising:
  a seat;
  a seat back pivotally adjustable relative to said seat;
  a linear recliner assembly disposed within said seat, said linear recliner assembly including:
    a housing;
    a first gear assembly rotatably supported within said housing and having a counter thrust component;
    a second gear assembly supported by said housing and in constant mesh engagement with said first gear assembly and said recliner rod, said constant mesh engagement enabling linear movement of said recliner rod relative to said housing and causing an axial thrust load on said first gear assembly;
    a recliner rod connected between said second gear assembly and said seat back; and
    wherein said second gear assembly is in constant engagement with said recliner rod for enabling linear movement of said recliner rod relative to said housing, said counter thrust component balances said axial thrust load on said first gear assembly, and linear movement of said recliner rod enables pivotal movement of said seat back relative to said seat.

6. The reclining seat assembly of claim 5, wherein said constant mesh engagement between said first gear assembly and said second gear assembly includes constant helical mesh engagement.

7. The reclining seat assembly of claim 6, wherein said counter thrust component includes a helical gear assembly, said counter thrust component having a gear index opposite of said constant helical mesh engagement between said first gear assembly and said second gear assembly.

8. The reclining seat assembly of claim 5, wherein all gear components of said first gear assembly, including said counter thrust component, rotate within a plane generally perpendicular to all gear components of said second gear assembly.

9. The linear recliner assembly of claim 1, wherein said engagement of said first and second gear assemblies provides an increased gear ratio from said first gear assembly to said second gear assembly.

10. The linear recliner assembly of claim 9, wherein said gear ratio is approximately 1:1.5.

11. The linear recliner assembly of claim 1, wherein gear components of said first gear assembly rotate within a plane generally perpendicular to gear components of said second gear assembly.

12. The linear recliner assembly of claim 11, wherein said first gear assembly includes:
  a first gear plate rotatably supported within said housing; and a second gear plate rotatably supported within said housing and in constant mesh engagement with said first gear plate.

13. The linear recliner assembly of claim 12, wherein said first gear assembly further includes:
a third gear plate rotatably supported within said housing and in constant mesh engagement with said second gear plate; and
a fourth gear plate rotatably supported within said housing and in constant mesh engagement with said third gear plate.

14. The linear recliner assembly of claim 13, wherein said second gear assembly includes a recliner gear axially aligned with said recliner rod and in constant mesh engagement with said fourth gear plate and said recliner rod.

15. The recliner assembly of claim 14, wherein:
said first gear plate includes a first gear surface;
said second gear plate includes second and third gear surfaces, said second gear surface in constant mesh engagement with said first gear surface;
said third gear plate includes fourth and fifth gear surfaces, said fourth gear surface in constant engagement with said third gear surface;
said fourth gear plate includes sixth and seventh gear surfaces, said sixth gear surface in constant mesh engagement with said fifth gear surface; and
wherein said recliner gear comprises an eighth gear surface disposed about an outside diameter of said recliner gear, said eighth gear surface in constant mesh engagement with said seventh gear surface.

16. The linear recliner assembly of claim 14, wherein said recliner gear includes an internally disposed screw gear surface in constant mesh engagement with a screw thread portion of said recliner rod.

17. The linear recliner assembly of claim 15, wherein said fourth gear plate and said recliner gear are helical gears enabling said eighth gear surface to rotate in a generally perpendicular plane relative to said seventh gear surface.

18. The linear recliner assembly of claim 1, wherein said first gear assembly is mechanically actuated by a dial for manually operating said linear recliner assembly.

19. The linear recliner assembly of claim 1, wherein said first gear assembly is mechanically actuated by an electric motor for remote operation of said linear recliner.

20. The recliner gear assembly of claim 1, wherein said second gear assembly includes a recliner gear housing for said recliner gear and said recliner gear includes at least one planar face that selectively engages a corresponding planar face of said recliner gear housing for blocking linear movement of said recliner rod.

21. The linear recliner assembly of claim 5, wherein said engagement of said first and second gear assemblies provides an increased gear ratio from said first gear assembly to said second gear assembly.

22. The linear recliner assembly of claim 21, wherein said gear ratio is approximately 1:1.5.

23. The reclining seat assembly of claim 5, wherein gear components of said first gear assembly rotate within a plane generally perpendicular to gear components of said second gear assembly.

24. The reclining seat assembly of claim 23, wherein said first gear assembly includes:
a first gear plate rotatably supported within said housing; and
a second gear plate rotatably supported within said housing and in constant mesh engagement with said first gear plate.

25. The reclining seat assembly of claim 24, wherein said first gear assembly further includes:
a third gear rotatably supported within said housing and in constant mesh engagement with said second gear plate; and
a fourth gear plate supported within said housing and in constant mesh engagement with said third gear plate.

26. The reclining seat assembly of claim 25, wherein said second gear assembly includes a recliner gear axially aligned with said recliner rod and in constant mesh engagement with said fourth gear plate and said recliner rod.

27. The reclining seat assembly of claim 26, wherein:
said first gear plate includes a first gear surface;
said second gear plate includes second and third gear surfaces, said second gear surface in constant mesh engagement with said first gear surface;
said third gear plate includes fourth and fifth gear surfaces, said fourth gear surface in constant engagement with said third gear surface;
said fourth gear plate includes sixth and seventh gear surfaces, said sixth gear surface in constant mesh engagement with said fifth gear surface; and
wherein said recliner gear comprises an eighth gear surface disposed about an outside diameter of said recliner gear, said eighth gear surface in constant mesh engagement with said seventh gear surface.

28. The recliner seat assembly of claim 27, wherein said recliner gear includes an internally disposed screw gear surface in constant mesh engagement with a screw thread portion of said recliner rod.

29. The recliner seat assembly of claim 27, wherein said seventh and eighth gears are a helical gears enabling said eighth gear surface to rotate in a generally perpendicular plane relative to said seventh gear surface.

30. The reclining seat assembly of claim 23, wherein said first gear assembly is in mechanical communication with a dial for manually operating said linear recliner assembly.

31. The reclining seat assembly of claim 23, wherein said first gear assembly is in mechanical communication with an electric motor for remote operation of said linear recliner.

32. The reclining seat assembly of claim 25, wherein said second gear assembly includes a housing for said recliner gear and said recliner gear includes at least one planar face that selectively engages a corresponding planar face of said recliner gear housing for blocking linear movement of said recliner rod.

* * * * *

UNITED STATES PATENT AND TRADEMARK OFFICE
CERTIFICATE OF CORRECTION

PATENT NO.    : 6,547,332 B2
DATED         : April 15, 2003
INVENTOR(S)   : Srinivas Pejathaya It is certified that error appears in the above-identified patent and that said Letters Patent is hereby corrected as shown below:

<u>Title page,</u>
Item [73], Assignee, "Fishers" should be -- Fisher --.

<u>Column 8,</u>
Line 52, "claim 25" should be -- claim 26 --.

Signed and Sealed this

Sixteenth Day of September, 2003

JAMES E. ROGAN
*Director of the United States Patent and Trademark Office*